(12) United States Patent
Yilmazer et al.

(10) Patent No.: US 8,923,170 B2
(45) Date of Patent: Dec. 30, 2014

(54) FULL-DUPLEX SINGLE-ENDED SERIAL LINK COMMUNICATION SYSTEM

(75) Inventors: Caglar Yilmazer, Istanbul (TR); Mustafa Ertugrul Oner, San Jose, CA (US)

(73) Assignee: Maxim Integrated Products, Inc., San Jose, CA (US)

(*) Notice: Subject to any disclaimer, the term of this patent is extended or adjusted under 35 U.S.C. 154(b) by 228 days.

(21) Appl. No.: 13/271,628

(22) Filed: Oct. 12, 2011

(65) Prior Publication Data
US 2013/0021953 A1 Jan. 24, 2013

Related U.S. Application Data

(63) Continuation-in-part of application No. 12/545,744, filed on Aug. 21, 2009, now Pat. No. 8,098,602.

(51) Int. Cl.
*H04B 1/44* (2006.01)
*H04B 1/56* (2006.01)
*H04L 5/14* (2006.01)
*H04L 25/02* (2006.01)

(52) U.S. Cl.
CPC ............ *H04L 5/143* (2013.01); *H04L 25/0272* (2013.01)
USPC .......................................... 370/282; 370/276

(58) Field of Classification Search
USPC ........................................................ 370/282
See application file for complete search history.

(56) References Cited

U.S. PATENT DOCUMENTS

| 6,272,130 B1 | 8/2001 | Panahi et al. |
| 7,327,381 B2 | 2/2008 | Suzuki |
| 2008/0040765 A1* | 2/2008 | Bradshaw et al. ............ 725/121 |
| 2010/0104029 A1* | 4/2010 | Lee et al. ...................... 375/257 |

FOREIGN PATENT DOCUMENTS

| EP | 2237419 | 10/2010 |
| WO | 2008/056933 | 5/2008 |
| WO | WO 2008056933 A1 * | 5/2008 |

* cited by examiner

*Primary Examiner* — Noel Beharry
*Assistant Examiner* — Farhad Ali
(74) *Attorney, Agent, or Firm* — Advent, LLP

(57) ABSTRACT

A system for full duplex communication using a single-ended communications link is described. The system includes a first link interface configured to generate a signal for transmission via the single-ended communications link. The signal includes data encoded in a forward channel. The system also includes a second link interface configured to receive the signal from the first link interface via the single-ended communications link and modulate the signal to encode data in a reverse channel so that the signal includes the forward channel data and the reverse channel data simultaneously.

20 Claims, 11 Drawing Sheets

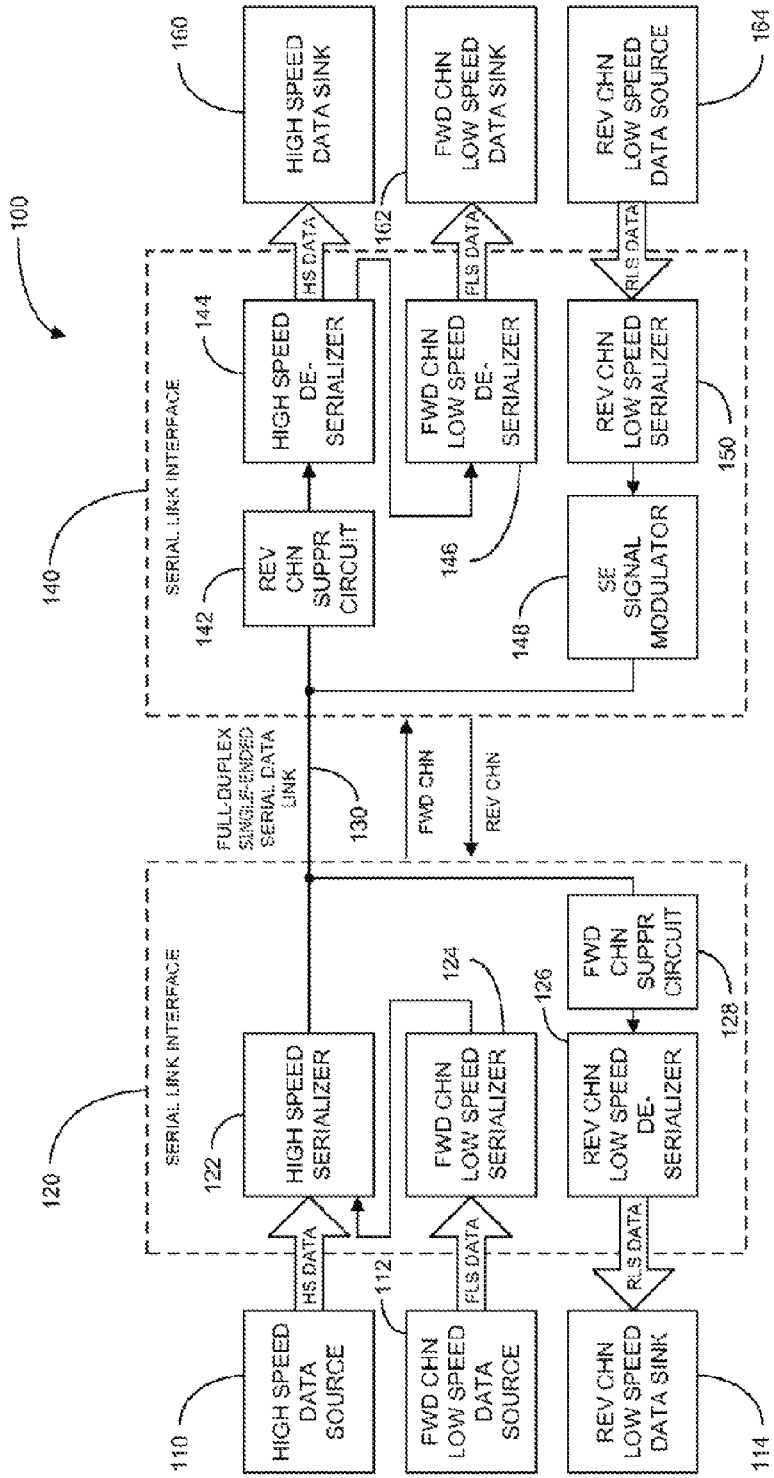

| V0 | V1 | V2 | ... | VN | A | FCC |

FORWARD CHANNEL FRAME

FIG. 2B

FULL-DUPLEX SINGLE-ENDED SERIAL LINK COMMUNICATION SYSTEM

CROSS-REFERENCE TO RELATED APPLICATIONS

The present application is a continuation-in-part under 35 U.S.C. §120 of U.S. patent application Ser. No. 12/545,744, entitled "SYSTEM AND METHOD FOR TRANSFERRING DATA OVER FULL-DUPLEX DIFFERENTIAL SERIAL LINK," which is hereby incorporated by reference in its entirety.

BACKGROUND

In many applications, high speed data is transferred from a source to a sink substantially simultaneously with the transfer of low speed data. For example, in video applications, video data (e.g., relatively high speed data) is transferred from a video source (e.g., a camera) to a video sink (e.g., a display). Simultaneously with the transfer of the video data, control data (e.g., relatively low speed data) may be transferred, in both directions, between the video source and the video sink. For example, control data from the video source to the video sink may dictate how the video data is to be displayed. While, for example, control data from the video sink to the video source may dictate the view angle, exposure, focus of the camera, or status of video device. The high speed and the low speed data is typically transmitted via physical cables.

SUMMARY

A system for full duplex communication using a single-ended communications link is described. The system includes a first link interface configured to generate a signal for transmission via the single-ended communications link. The signal includes data encoded in a forward channel. The system also includes a second link interface configured to receive the signal from the first link interface via the single-ended communications link and modulate the signal to encode data in a reverse channel so that the signal includes the forward channel data and the reverse channel data simultaneously.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

FIG. 1A is a block diagram illustrating a system for transferring data in accordance with an example implementation of the disclosure.

FIG. 1B is a signal diagram illustrating a forward channel data frame in accordance with another example implementation of the disclosure.

FIG. 2B is a signal diagram illustrating another forward channel data frame in accordance with another example implementation of the disclosure.

DETAILED DESCRIPTION

Overview

Figure 1C:
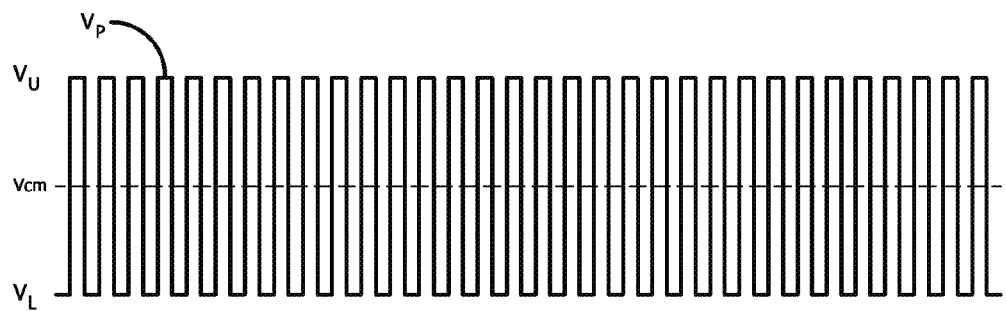
FIGS. 1C through 1E are time-domain graphs illustrating signals encoded in forward and reverse channels in accordance with example implementation of the disclosure.

High speed data may be transferred from a source to a sink at least substantially simultaneously with the transfer of low speed data. In one or more implementations, automotive and aircraft systems may utilize video application and audio applications to provide additional features to the systems (e.g., supplement safety features, additional entertainment devices, etc.). For example, an automobile may include a central information display, a cluster display, rear seat entertainment units, and so forth. However, it may be desirable to reduce the physical space and weight of the cables used for transferring the data because of generally stringent space and weight requirements in automobiles and airplanes.

Therefore, a system for full duplex communication using a single-ended communications link is described. The system includes a first link interface configured to generate a signal for transmission via the single-ended communications link. The signal includes data encoded in a forward channel. The system also includes a second link interface configured to receive the signal from the first link interface via the single-ended communications link and modulate the signal to encode data in a reverse channel so that the signal includes the forward channel data and the reverse channel data simultaneously. The signals may be transmitted over a single-ended communications link. The single-ended communications link may be coupled between the first link interface and the second link interface. In one or more implementations, the single-ended communications link may comprise a single coaxial cable, a single printed circuit board trace, or the like.

In another implementation, the system may include suppression circuitry to suppress a portion of the data to output the relevant data portion of the signal. For example, the system may include forward channel suppression circuitry configured to suppress the forward data portion of the signal to output the reverse data portion of the signal. In another example, the system may include reverse channel suppression circuitry configured to suppress the reverse channel data portion of the signal to output the forward data portion of the signal.

In the following discussion, an example system for full duplex communication using a single-ended communications link is described.

Example Implementations

FIG. 1A illustrates a block diagram of an example system 100 for transferring data in accordance with an implementation of the disclosure. In summary, the system 100 employs a data transmission technique for providing a full-duplex single-ended serial data link. In particular, the data transmission technique entails transmitting high speed data (e.g., video data) and low speed data (e.g., audio and/or control data) in a forward channel simultaneously with the transmission of low speed data (e.g., control data) in a reverse channel. Additionally, the full-duplex transmission of the data may occur over an inexpensive physical medium, such as a single coaxial cable, a printed circuit board (PCB) trace, or the like.

More specifically, the system 100 comprises a high speed data source 110, a forward channel (FWD CHN) low speed data source 112, and a reverse channel (REV CHN) low speed data sink 114, all of which are situated at one end of a full-duplex single-ended serial data link 130. In one or more implementations, the full-duplex single-ended serial data link 130 comprises a single communication link. For example, the single communication link may be a single coaxial cable, a single PCB trace, a single wire, or the like. The high speed data source 110 may generate parallel high speed (HS) data (e.g., video data). The FWD CHN low speed data source 112 may generate parallel, forward (channel) low speed (FLS) data (e.g., control and/or audio data). The REV CHN low speed data sink 114 may receive parallel, reverse (channel) low speed (RLS) data (e.g., control data).

The term "high speed data" means that it is transmitted at a higher rate (e.g., higher frequency) than the "low speed data." For example, the high speed data may be video data. Whereas, the low speed data may be audio and/or control data. It shall be understood that "high speed data" need not be limited to video, and may encompass other types of data. Similarly, the "low speed data" need not be limited to control and/or audio data, and may encompass other types of data.

The system 100 further comprises a serial link interface 120 for interfacing the high speed data source 110, FWD CHN low speed data source 112, and REV CHN low speed data sink 114 to the communications link 130, which, in this case, is configured as a full-duplex single-ended serial data link. The serial link interface 120 comprises a high speed serializer 122, a FWD CHN low speed serializer 124, a REV CHN low speed deserializer 126, and a FWD CHN suppression circuit 128. The high speed serializer 122 converts the parallel HS data from the high speed data source 110, and time-multiplexes it with the serialized FLS data to generate a forward channel frame for transmission via the full-duplex single-ended serial data link 130.

The FWD CHN low speed serializer 124, in turn, converts the parallel FLS data from the FWD CHN low speed data source 112 into serial FLS data, which, as discussed, is time-multiplexed with the high speed serial data. In some cases, the FWD CHN low speed data source 112 may already generate FLS data in a serial manner. In such a case, the FWD CHN low speed serializer 124 may be eliminated, and the FWD CHN low speed data source 112 may be directly coupled to the high speed serializer 122.

The FWD CHN suppression circuit 128 at least substantially suppresses the forward channel signal (e.g., the single-ended signaling of the serialized HS and FLS data) in order to at least substantially output the serial, reverse (channel) low speed (RLS) signal received from the opposite end of the communications link 130. As an example, the FWD CHN suppression circuit 128 may be a low pass filter (LPF) or band pass filter (BPF) adapted to filter out the high-frequency forward channel signal. As another example, the FWD CHN suppression circuit 128 may be a signal cancellation device for at least substantially cancelling out the forward channel signal. The REV CHN low speed deserializer 126 converts the serial RLS data into parallel RLS data for processing by the REV CHN low speed data sink 114.

At the other end of the communications link 130, the system 100 comprises a high speed data sink 160, a FWD CHN low speed data sink 162, and a REV CHN low speed data source 164. The high speed data sink 160 receives and processes the parallel high speed (HS) data (e.g., video data) from the high speed data source 110. The FWD CHN low speed data sink 162 receives and processes the parallel FLS data (e.g., control and/or audio data) from the FWD CHN low speed data source 112. The REV CHN low speed data source 164 generates the parallel, RLS data (e.g., control data) for transmission to the REV CHN low speed data sink 114.

The system 100 further comprises a serial link interface 140 for interfacing the high speed data sink 160, FWD CHN low speed data sink 162, and REV CHN low speed data source 164 to the communications link 130. The serial link interface 140 comprises a REV CHN suppression circuit 142, a high speed deserializer 144, a FWD CHN low speed deserializer 146, a REV CHN low speed serializer 150, and a single-ended signal modulator 148.

The REV CHN suppression circuit 142 suppresses the reverse channel signal (e.g., the single-ended-modulated serialized RLS data) in order to at least substantially output the forward channel signal (e.g., the HS and FLS data) received from the opposite end of the communications link 130. As an example, the REV CHN suppression circuit 142 may be a high pass filter (HPF) or BPF adapted to filter out the low-frequency reverse channel signal. As another example, the REV CHN suppression circuit 142 may be a signal cancellation device for at least substantially cancelling out the reverse channel signal.

The high speed deserializer 144 converts the forward channel serial data into forward channel parallel data. The HS data portion of the forward channel parallel data is sent to the high speed data sink 160 for processing. The FLS data portion of the forward channel parallel data is sent to the FWD CHN low speed deserializer 146, which converts the FLS data into parallel. The parallel FLS data is sent to the FWD CHN low speed data sink 162 for processing. In some cases, the FWD CHN low speed data sink 162 may have a serial data input to receive the FLS data, and the FLS data portion of the HS data is only a single bit. In such a case, the FWD CHN low speed deserializer 146 may be eliminated, and the corresponding bit of the high speed deserializer 144 may be connected directly to the FWD CHN data sink 162.

The REV CHN low speed serializer 150 converts the parallel RLS data from the REV CHN low speed data source 164 into serial RLS data. In some cases, the REV CHN low speed data source 164 outputs the RLS data in a serial manner. In such a case, the REV CHN low speed serializer 150 may be eliminated, and the REV CHN low speed data source 164 may be coupled directly to the single-ended signal modulator 148. The single-ended signal modulator 148 modulates the forward channel signal with the RLS data. The single-ended signal modulator 148 may include a slew rate control in order to modulate the forward channel signal in a relatively slow manner in order to control the spectral content of the reverse channel so that it is at least substantially isolated from the spectral content of the forward channel.

FIG. 1B illustrates a signal diagram of an example forward channel data frame in accordance with another implementation of the disclosure. In this example, the forward channel frame includes an entire word of the HS data. For instance, HS data bits HS 0 to HSN are included in the forward channel frame, where N+1 is the length of the HS data word. Additionally, the forward channel frame includes a portion of a word of the FLS data. For instance, a single bit of the forward channel frame is reserved for the FLS data. It shall be understood that more than one bit of the forward channel may be used for the FLS data and/or other data.

Figure 1D:
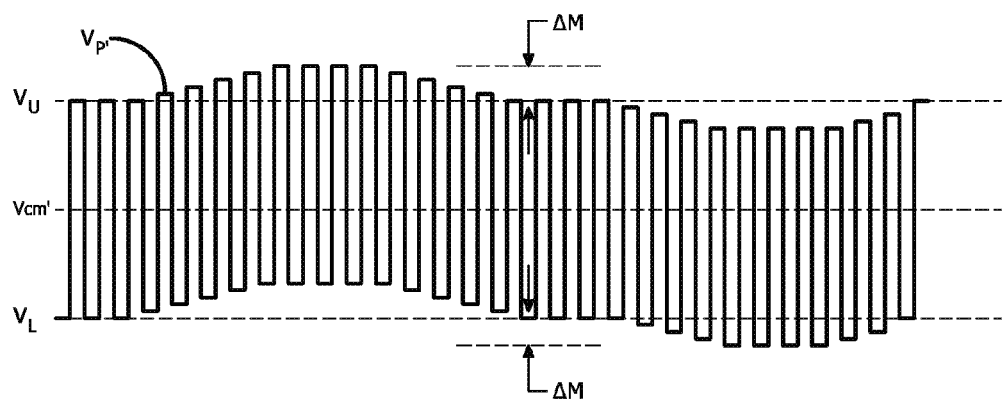
Figure 1E:

FIGS. 1C through 1E illustrates time-domain graphs of example signals of the forward and reverse channels in accordance with another implementation of the disclosure. FIG. 1C illustrates the forward channel single-ended signal with a repetitive signal (e.g., 101010) pattern. FIG. 1D illustrates the modulated forward channel single-ended signal. FIG. 1E illustrates the recovered reverse channel data after high frequency components are suppressed.

Referring to FIG. 1C, the forward channel single-ended signal comprises a voltage signal Vp. The voltage signal Vp swings between an upper voltage $V_U$ and a lower voltage $V_L$. As illustrated, the voltage signal Vp is initially (e.g., first cycle) at the lower voltage $V_L$ and then swings to the upper voltage $V_U$ during the second cycle. However, it is understood that the voltage signal Vp may initially begin at the upper voltage $V_U$. While FIG. 1C illustrates a repetitive pattern, it will be understood that the forward channel single-ended signal may be based upon data that is random and, therefore, the forward single-ended signal may be comprised of signal that represents the random data.

Referring to FIG. 1D, the forward channel single-ended signal is modulated by the reverse channel signal. The modulated single-ended signal comprises a modulated voltage signal Vp'. The forward channel single-ended signal may be modulated above the upper voltage $V_U$ or below the lower voltage $V_L$. For instance, in a first cycle, the modulated signal Vp' may comprise an upper voltage of $V_U+\Delta M$ (e.g., peak variation of the amplitude). In another cycle of the reverse channel signal, the modulated signal Vp' may be at a lower voltage of $V_L-\Delta M$ (e.g., trough variation of the amplitude). However, as shown in FIG. 1D, the modulated signal Vp' may be modulated to values between $V_U$ and $V_U+\Delta M$ as well as values between $V_L$ and $V_L-\Delta M$.

Figure 2A:
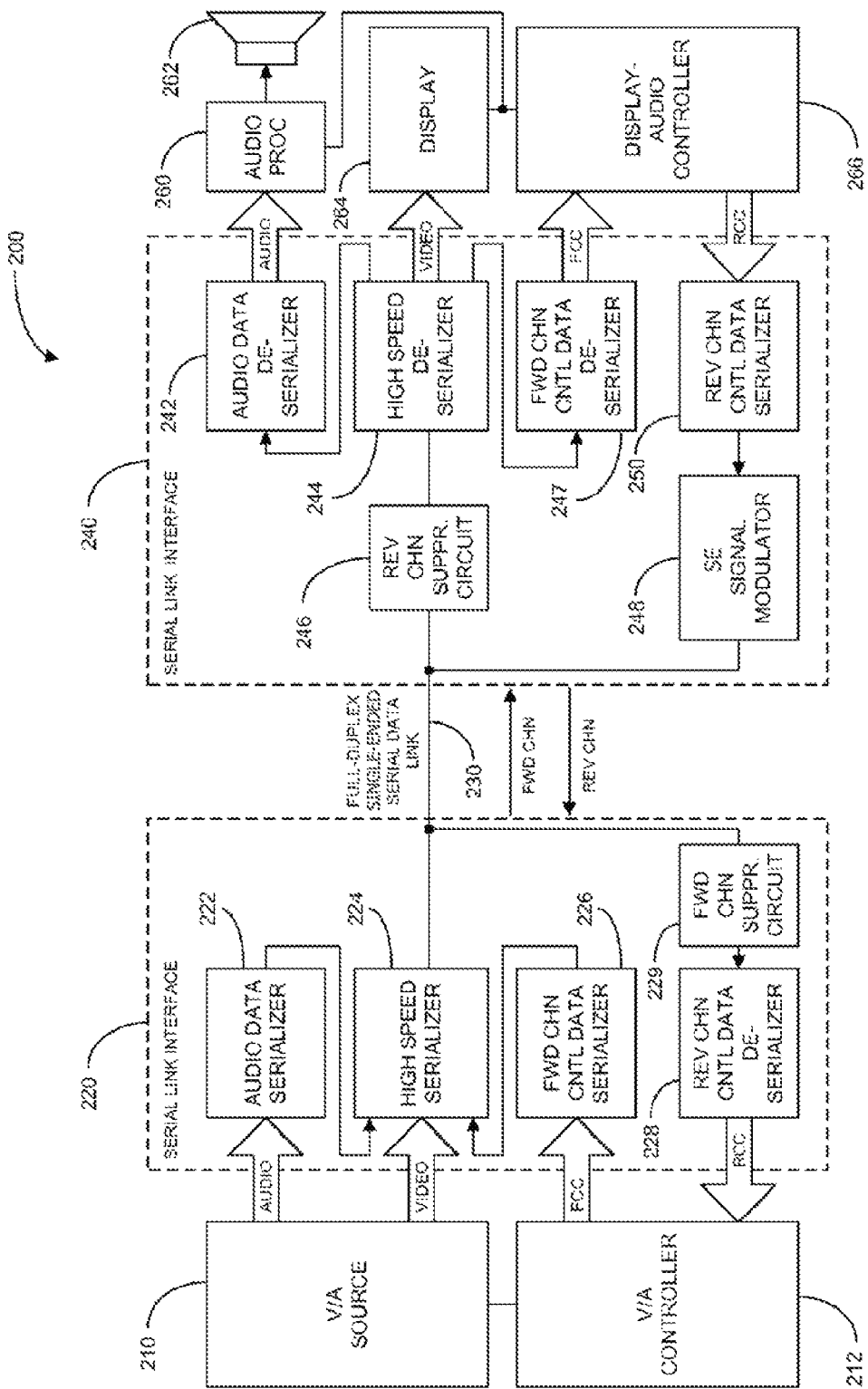
FIG. 2A is a block diagram illustrating a system for transferring data in accordance with another example implementation of the disclosure, wherein the system includes a video/audio source, a video/audio controller, a display, an audio processor, and a display-audio controller.

FIG. 1E illustrates the resulting signal (e.g., the recovered reverse channel signal) from the processing of the modulated voltage Vp' signal by the FWD CHN suppression circuit 128. Thus, the FWD CHN suppression circuit 128 extracts the reverse channel signal by, in part, processing the modulated portions of the forward channel single-ended signal to output the reverse channel signal FIG. 2A illustrates a block diagram of another example system 200 for transferring data in accordance with another implementation of the disclosure. The system 200 is an example application of the system 100, previously described. In particular, the system 200 is configured for transferring multimedia data, such as video and audio data, and control data in a forward channel, and transferring control data in a reverse channel. This may be the case where a video/audio (V/A) source, such as a camera or DVD player, sends video, audio, and control data to a display in the forward channel. The forward channel control data may dictate how the video is to be displayed and how the audio is to be reproduced. The display and audio circuit may include an associated controller for sending control data back to the V/A source in the reverse channel. The reverse channel control data may dictate how the V/A source generates the video and audio data.

More specifically, the system 200 comprises a video/audio (V/A) source 210 and a V/A controller 212, both situated at one end of a full-duplex single-ended serial data link 230. The V/A source 210, under the control of the V/A controller 212, generates parallel video data and parallel audio data. As an example, the audio data may be in adaptive $I^2S$ format. The V/A controller 212 may generate parallel forward channel control (FCC) data. The V/A controller 212 may also receive parallel, reverse channel control (RCC) data. As previously discussed, the FCC data may be for controlling one or more aspects of the video displaying and/or audio playback. The RCC data may be for controlling one or more aspects of the capturing and generating of the video and audio data. The data transfer rate of the video data is typically higher than the data transfer rate of the audio and FCC data.

The system 200 further comprises a serial link interface 220 for interfacing the V/A source 210 and V/A controller 212 to the full-duplex single-ended serial data link 230. The serial link interface 220 comprises an audio data serializer 222, a high speed serializer 224, a FWD CHN control data serializer 226, a REV CHN control data deserializer 228, and a FWD CHN suppression circuit 229.

The audio data serializer 222 converts parallel audio data from the V/A source 210 into serial audio data. Similarly, the FWD CHN control data serializer converts parallel FCC data from the V/A controller 212 into serial FCC data. The high speed serializer 224 converts the parallel video data from the V/A source 210, and time-multiplexes it with the serialized audio data and the serialized FCC data to generate a forward channel frame for transmission via the full-duplex single-ended serial data link 230. In some cases, the V/A controller 212 may generate the FCC data in a serial manner, instead of in a parallel manner. In such a case, the FWD CHN control data serializer 226 may be eliminated, and the V/A controller 212 may be directly coupled to the high speed serializer 224.

The FWD CHN suppression circuit 229 suppresses the forward channel signal in order to at least substantially output the serial, reverse control (RCC) data received from the opposite end of the full-duplex single-ended serial data link 230. As an example, the FWD CHN suppression circuit 229 may be a LPF or BPF adapted to filter out the forward channel signal. As another example, the FWD CHN suppression circuit 229 may be a signal cancellation device adapted to at least substantially cancel out the forward channel signal. The REV CHN control data deserializer 228 converts the serial RCC data into parallel RCC data for processing by the V/A controller 212. In some cases, the V/A controller 212 may be configured to receive RCC data in a serial manner, instead of in a parallel manner. In such a case, the REV CHN control data deserializer 228 may be eliminated, and the V/A controller 212 may be directly coupled to the FWD CHN suppression circuit 229.

At the other end of the full-duplex single-ended serial data link 230, the system 200 comprises an audio processor 260, a transducer 262 (e.g., a speaker), a display 264 (e.g., a liquid crystal display (LCD)), and a display-audio controller 266. The audio processor 260, under the control of the display-audio controller 266, processes the received parallel audio data to generate an analog audio signal for driving the speaker 262. The display 264, under the control of the display-audio controller 266, processes the received parallel video data in order to display the corresponding images. The display-audio controller 266 may control the audio processor 260 and display 264 based on the received FCC data. Additionally, the display-audio controller 266 may generate RCC data for transmission to the V/A controller 212 in order to control one or more operations of the V/A source 210.

The system 200 further comprises a serial link interface 240 for interfacing the audio processor 260, the display 264, and the display-audio controller 266 to the full-duplex single-ended serial data link 230. The serial link interface 240 comprises an audio data deserializer 242, a REV CHN suppression circuit 246, a high speed deserializer 244, a FWD CHN control data deserializer 247, a single-ended (SE) signal modulator 248, and a REV CHN control data serializer 250.

The REV CHN suppression circuit 246 suppresses the reverse channel signal (e.g., the RCC data) in order to at least substantially output the forward channel signal (e.g., video, audio, and FCC data). In an implementation, the REV CHN suppression circuit 246 may be a HPF or BPF adapted to filter out the reverse channel signal. In another implementation, the REV CHN suppression circuit 246 may be a signal cancellation device for at least substantially cancelling out the reverse channel signal.

The high speed deserializer 244 converts the forward channel serial data into forward channel parallel data. The video data portion of the forward channel parallel data is sent to the display 264 for image displaying purposes. The audio data portion of the forward channel parallel data is sent to the audio data deserializer 242. The audio data deserializer 242 converts the serial audio data into parallel audio data, and provides the parallel audio data to the audio processor 260 for sound generating purposes. The FCC data portion of the forward channel parallel data is sent to the FWD CHN control data deserializer 247, which converts the FCC data into parallel. The parallel FCC data is sent to the display-audio controller 266 for processing. In some cases, the display-audio controller 266 may only receive control data via a serial port. In such a case, the FWD CHN control data deserializer 247 may be eliminated, and the corresponding bit output of the high speed deserializer 244 may be connected directly to the serial port of the display-audio controller 266.

The REV CHN control data serializer 250 converts the parallel RCC data from the display-audio controller 266 into serial RCC data. The SE signal modulator 248 modulates the forward channel signal with the RCC data. The SE signal modulator 248 may include a slew rate control to modulate the forward channel signal in a relatively slow manner to control the spectral content of the reverse channel so as to at least substantially isolate the reverse channel from the spectral content of the forward channel. In some cases, the display-audio controller 266 may only output control data via a serial port. In such a case, the FWD CHN control data serializer 250 may be eliminated, and the corresponding bit output of the display-audio controller 266 may be connected directly to the SE signal modulator 248.

Figure 2B:
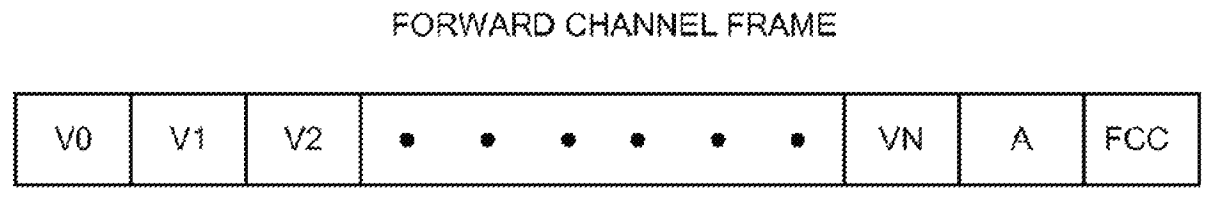

FIG. 2B illustrates a signal diagram of an example forward channel data frame in accordance with another implementation of the disclosure. In this example, the forward channel frame includes an entire word of the video data. For instance, video data bits V0 to VN are included in the forward channel frame, where N+1 is the length of the video data word. Additionally, the forward channel frame includes a portion (e.g., one bit) of the audio data word. Further, the forward channel frame includes a portion (e.g., one bit) of the FCC data word. It shall be understood that more than one bit of the forward channel frame may be used for the audio data as well as for the FCC data.

Figure 3:
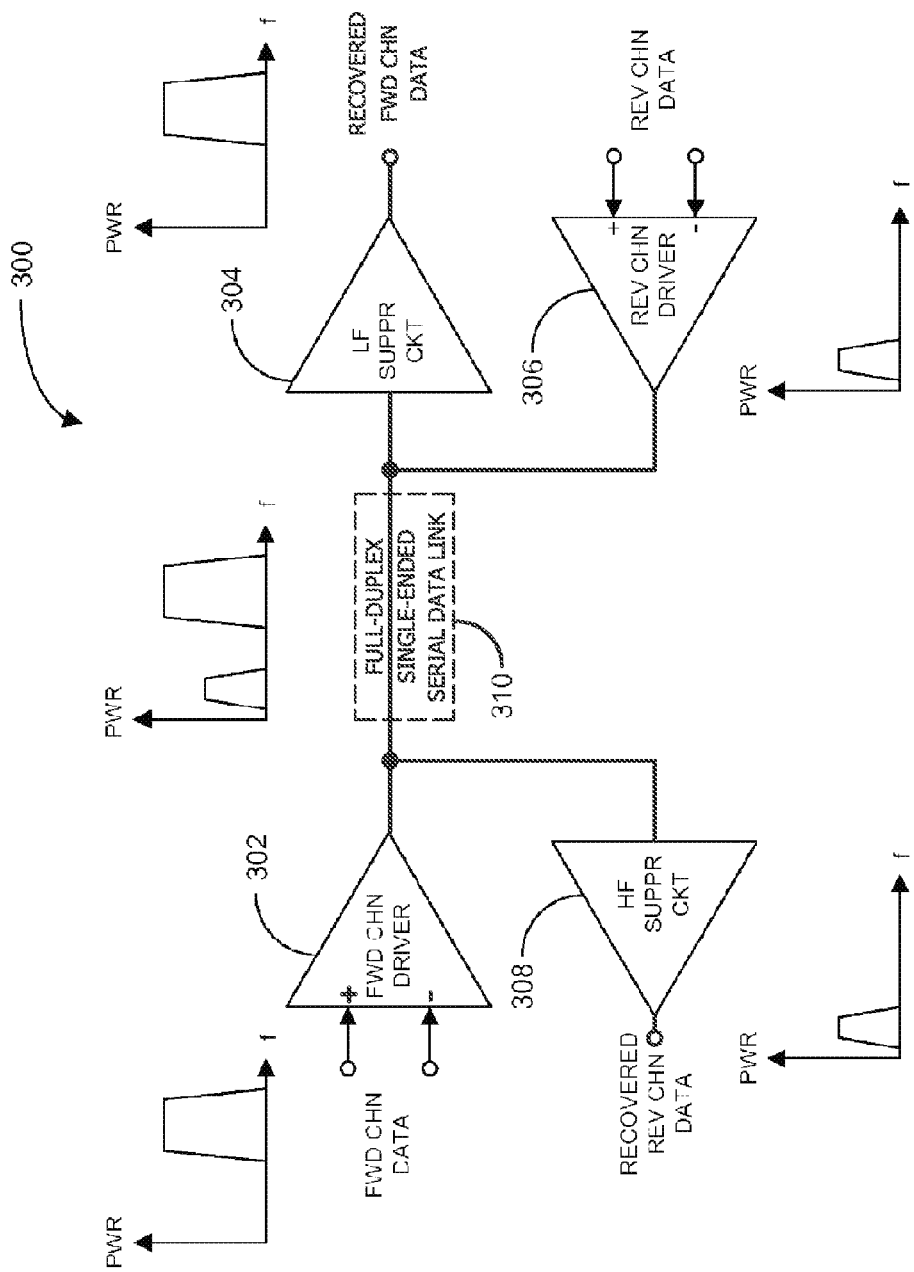
FIG. 3 is a block diagram illustrating a portion of the system for transferring data shown in FIG. 1, wherein the portion of the system includes a forward channel driver, a reverse channel driver, high-frequency suppression circuitry, and low-frequency suppression circuitry, and wherein the data is transmitted over a full-duplex single-ended serial data link.

FIG. 3 illustrates a block diagram of another example system 300 for transferring data in accordance with another implementation of the disclosure. The system 300 is used to exemplify the spectral content and processing of the forward and reverse channel signals in accordance with the concepts described herein. The system 300 comprises a FWD CHN driver 302 and a high frequency suppression circuit 308, both situated at a first end of a full-duplex single-ended serial link 310. The system 300 further comprises a low frequency (LF) suppression circuit 304 and a REV CHN driver 306, both situated at a second and opposite end of the full-duplex single-ended serial link 310.

As noted, the FWD CHN data, which is applied differentially to the inputs of the FWD CHN driver 302, has a relatively high frequency, band limited spectral content. Similarly, as noted, the REV CHN data, which is applied differentially to the inputs of the REV CHN driver 306, has a relatively low frequency, band limited spectral content. At the full-duplex single-ended serial data link 310, the forward channel signal is modulated single-endedly by the reverse channel signal. Thus, as noted, the spectral content of the modulated signal may include at least substantially non-overlapping low and high frequency spectral bands.

The LF suppression circuit 304, which may be an HPF, BPF, or low frequency cancellation circuit, removes the reverse channel signal to produce or recover the FWD CHN data, as noted. Similarly, the HF suppression circuit 308, which may be a LPF, BPF, or high frequency cancellation circuit, removes the forward channel signal to produce or recover the REV CHN data, as noted.

Figure 4:
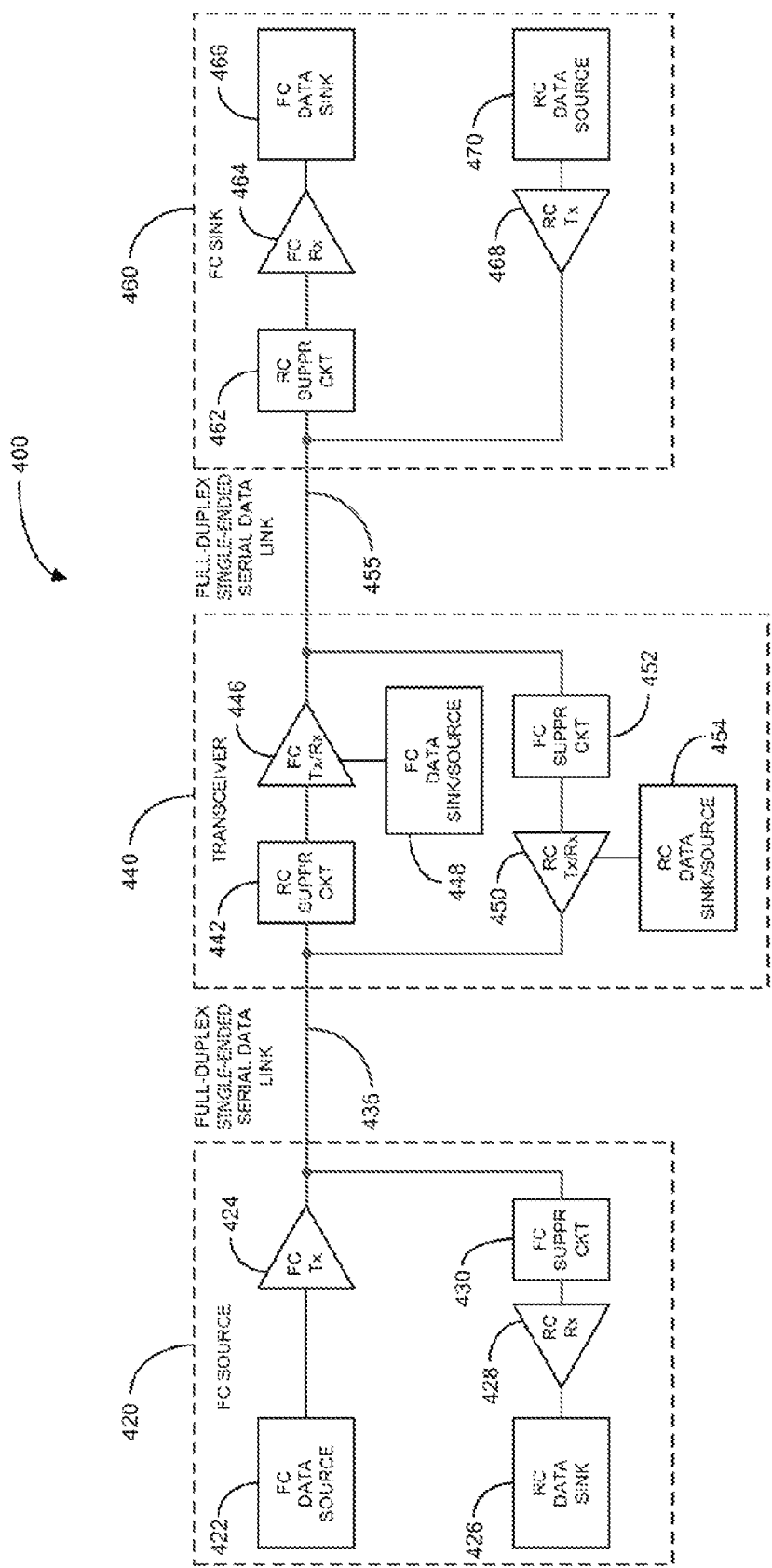
FIG. 4 is another block diagram illustrating a system for transferring data in accordance with another example implementation of the disclosure, wherein the system further includes a transceiver.

FIG. 4 illustrates a block diagram of another example system 400 for transferring data in accordance with another implementation of the disclosure. The systems 100 and 200 previously described may have a practical limitation on the length of the physical medium used for the full-duplex single-ended serial data link. That is, the forward and reverse channel signals may degrade to an unrecoverable level if the length of the serial data link is too long. To effectively extend the length of the communications link, one or more repeaters or transceivers may be implemented in a daisy-chain manner between both ends of the communications link. Additionally, such systems may be modified to form a ring structure by configuring each element of the ring as a repeater or transceiver. However, in this example, the system 400 employs a repeater or transceiver to effectively extend the length of the serial data link.

In particular, the system 400 comprises a forward channel (FC) source 420, a transceiver 440, and a forward channel (FC) sink 460. The system 400 further comprises a full-duplex single-ended serial data link 435 coupling the FC source 420 to the transceiver 440, and another full-duplex single-ended serial data link 455 coupling the transceiver 440 to the FC sink 460.

The FC source 420, in turn, comprises an FC data source 422, an FC transmitter (Tx) 424, an FC suppression circuit 430, an RC receiver (Rx) 428, and an RC data sink 426. The FC data source 422 generates data for the forward channel, which may include relatively high speed data and embedded relatively low speed data, as previously discussed. The FC Tx 424 forms the single-ended signaling of the FC data for transmission via the full-duplex single-ended serial data link 435. The FC suppression circuit 430 at least substantially suppresses the FC data signal in order to recover RC data signal received from the transceiver 440 or the FC sink 460 via the transceiver 440. The RC Rx 428 recovers the RC data and provides it to the RC data sink 426 for processing.

The FC sink 460, in turn, comprises an RC data source 470, an RC Tx 468, an RC suppression circuit 462, an FC Rx 464, and an FC data sink 466. The RC data source 470 generates relatively low speed data for the reverse channel. The RC Tx 468 modulates the FC signal with the RC data for transmission via the full-duplex single-ended serial data link 455. The RC suppression circuit 462 at least substantially suppresses the RC data signal in order to recover FC data received from the transceiver 440 or the FC source 420 via the transceiver 440. The FC Rx 464 recovers the FC data and provides it to the FC data sink 466 for processing. As previously discussed, the FC data may include the relatively high speed data, as well as the embedded relatively low speed data.

The transceiver 440, in turn, comprises an RC suppression circuit 442, an FC Tx/Rx 446, an FC data sink/source 448, an FC suppression circuit 452, an RC Tx/Rx 450, and an RC data sink/source 454. The RC suppression circuit 442 at least substantially suppresses the RC data signal from the full-duplex single-ended serial data link 435 in order to recover the FC data signal received from the FC source 420. The FC Tx/Rx 446 may recover the FC data and provide it to the FC data sink/source 448 for further processing. In another implementation, or in addition to, the FC Tx/Rx 446 may amplify and pass-through the received FC signal for transmission to the FC sink 460 by way of the full-duplex single-ended serial data link 455. As previously discussed, the FC data may include the relatively high speed data, as well as the embedded relatively low speed data.

The FC suppression circuit 452 at least substantially suppresses the FC data signal from the full-duplex single-ended serial data link 455 in order to recover RC data signal received from the FC sink 460. The RC Tx/Rx 450 may recover the RC data and provide it to the RC data sink/source 454 for processing. In another implementation, or in addition to, the RC Tx/Rx 450 may amplify and pass-through the received RC signal for transmission to the FC source 420 by way of the full-duplex single-ended serial data link 435.

Figure 5:
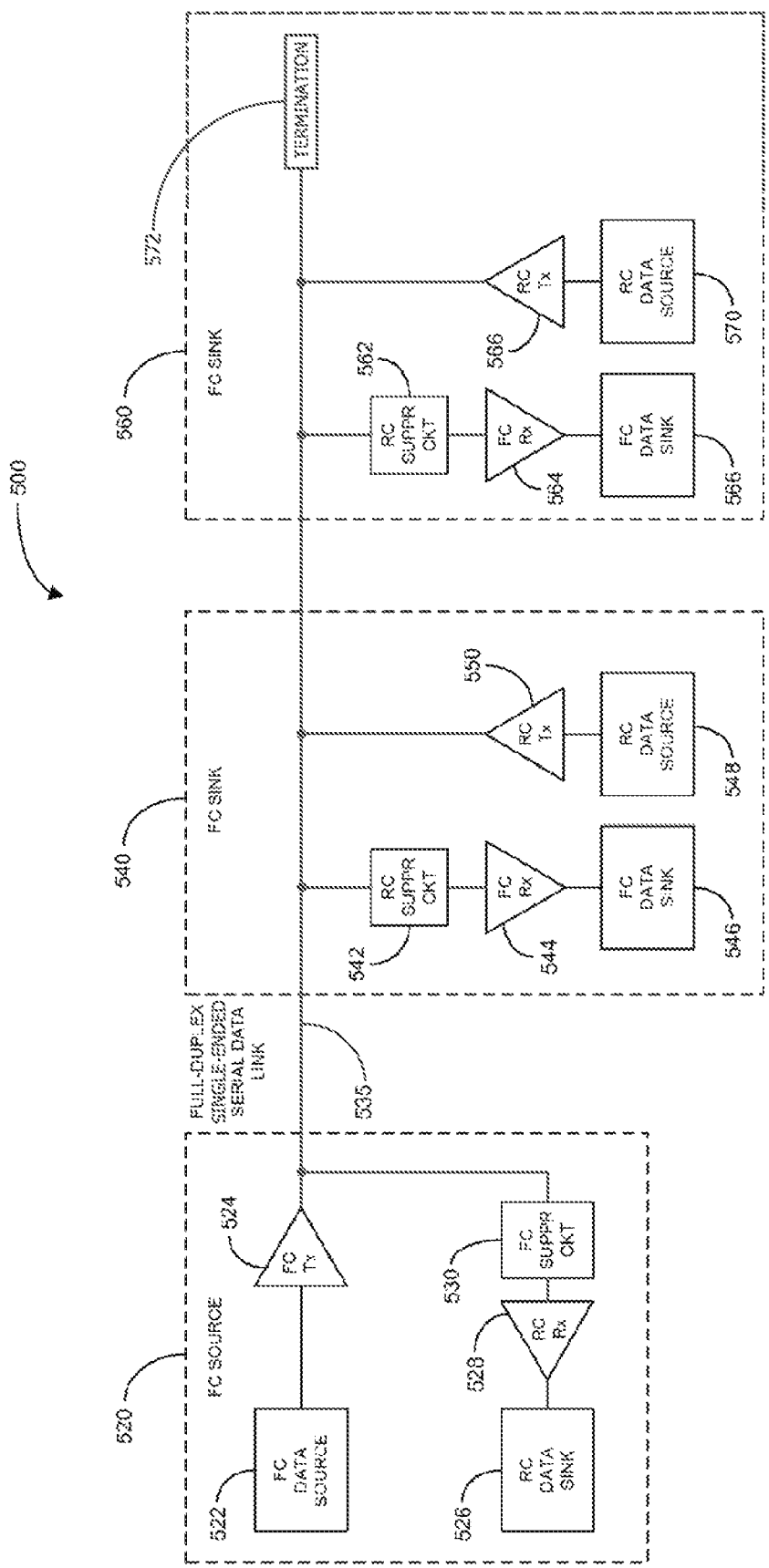
FIG. 5 is a block diagram illustrating a system for transferring data in accordance with another example implementation of the disclosure, wherein the system includes multiple forward channel sinks.

FIG. 5 illustrates a block diagram of another example system 500 for transferring data in accordance with another implementation of the disclosure. The systems 100 and 200 previously described only exemplified a single forward channel receiver. It shall be understood that such systems may include a plurality of forward channel receivers. For example, such systems may be configured as a point-to-multiple system. In this regard, the system 500 employs a pair of FC sinks for respectively receiving forward channel data from an FC source. It shall be understood that the system 500 may include more FC sinks for receiving forward channel data from the FC source.

In particular, the system 500 comprises an FC source 520, a first FC sink 540, and a second FC sink 560. The system 500 further comprises a full-duplex single-ended serial data link 535 coupling the FC source 520 to the first and second FC sinks 540, 560. As shown in FIG. 5, the full-duplex single-ended serial data link 535 may be terminated at a termination 572. In an implementation, the termination 572 may be a terminating device, such as a resistor, or the like.

The FC source 520, in turn, comprises an FC data source 522, an FC Tx 524, an FC suppression circuit 530, an RC Rx 528, and an RC data sink 526. The FC data source 522 generates data for the forward channel, which may include relatively high speed data and embedded relatively low speed data, as previously discussed. The FC Tx 524 forms the single-ended signaling of the FC data for transmission via the full-duplex single-ended serial data link 535. The FC suppression circuit 530 at least substantially suppresses the FC data signal in order to recover RC data signal received from the first and/or second FC sinks 540 and 560. The RC Rx 528 recovers the RC data and provides it to the RC data sink 526 for processing.

The first FC sink 540, in turn, comprises an RC suppression circuit 542, an FC Rx 544, an FC data sink 546, an RC data source 548, and an RC Tx 550. The RC suppression circuit 542 at least substantially suppresses the RC data signal in order to recover the FC data signal received from the FC source 520 via the full-duplex single-ended serial data 535. The FC Rx 544 recovers the FC data and provides it to the FC data sink 546 for processing. As previously discussed, the FC data may include the relatively high speed data, as well as the embedded relatively low speed data. The RC data source 548 generates relatively low speed data for the reverse channel. The RC Tx 550 modulates the FC signal with the RC data for transmission to the FC source 520 via the full-duplex single-ended serial data link 535.

The second FC sink 560 may be configured similarly or at least substantially the same as FC sink 540. For example, the FC sink 560 comprises an RC suppression circuit 562, an FC Rx 564, an FC data sink 566, an RC data source 570, and an RC Tx 566. The RC suppression circuit 562 at least substantially suppresses the RC data signal in order to recover FC data signal received from the FC source 520 via the full-duplex single-ended serial data 535. The FC Rx 564 recovers the FC data and provides it to the FC data sink 566 for processing. As previously discussed, the FC data may include the relatively high speed data, as well as the embedded relatively low speed data. The RC data source 570 generates relatively low speed data for the reverse channel. The RC Tx 566 modulates the FC signal with the RC data for transmission to the FC source 520 via the full-duplex single-ended serial data link 535.

The RC data from the second FC sink 560 may be time-division multiplexed with the RC data from the first FC sink 540 for transmission to the FC source 520. As an example, the FC sink 540 and FC sink 560 may be configured respectively as master and slave devices for priority in using the serial data link 535 for transmission of the RC data. In this regards, the FC sink 540 may use the serial data link 535 whenever it wants to transmit the RC data, and may give permission to the FC sink 560 to transmit the RC data via the serial data link. Other types of anti-collision or time-division multiplexing uses of the serial data link for transmission of the RC data may be employed.

Figure 6A:
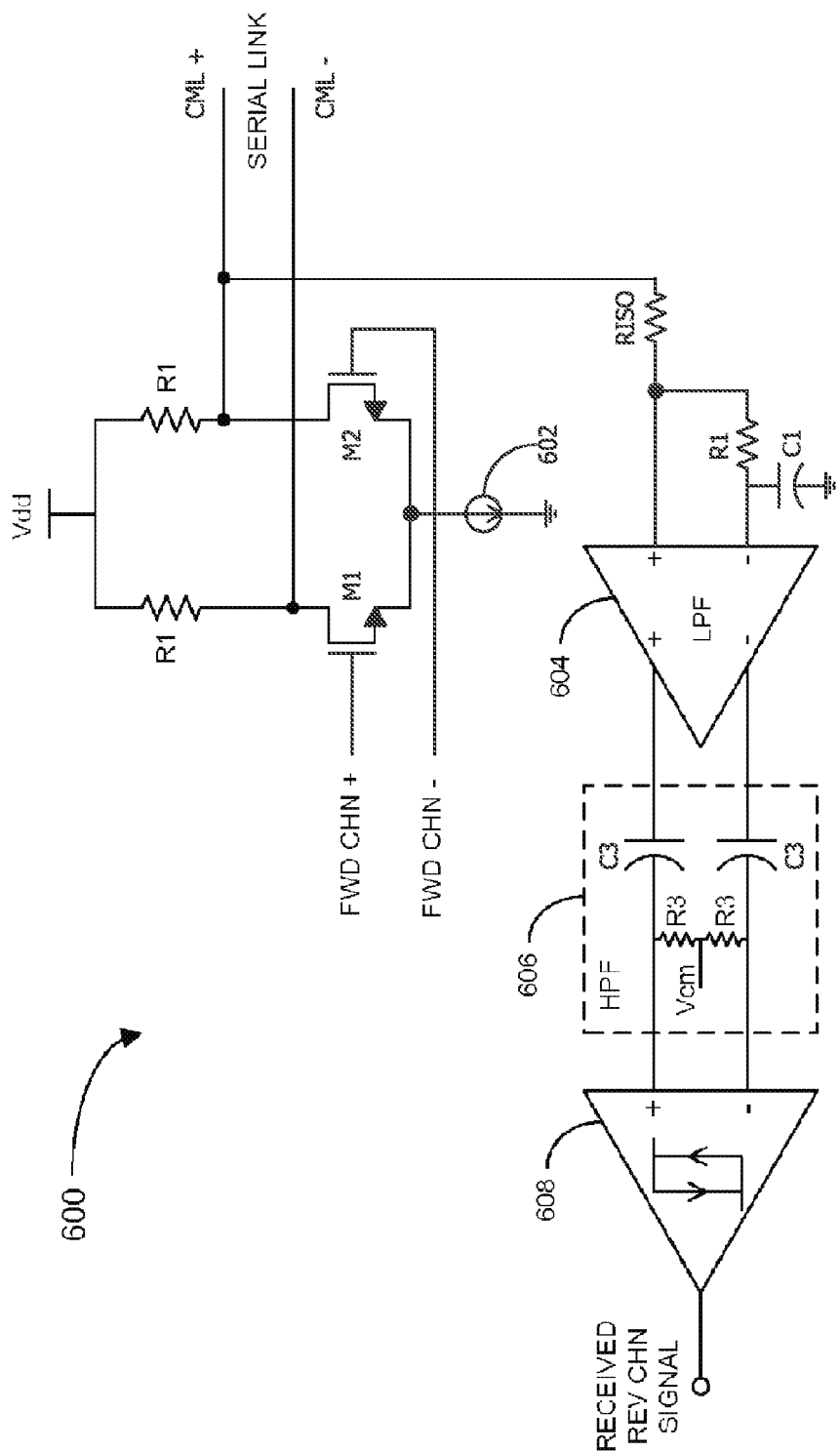
FIG. 6A is a block diagram illustrating a forward channel high speed data transmitter and a reverse channel low speed data receiver in accordance with an example implementation of the disclosure.
Figure 6B:
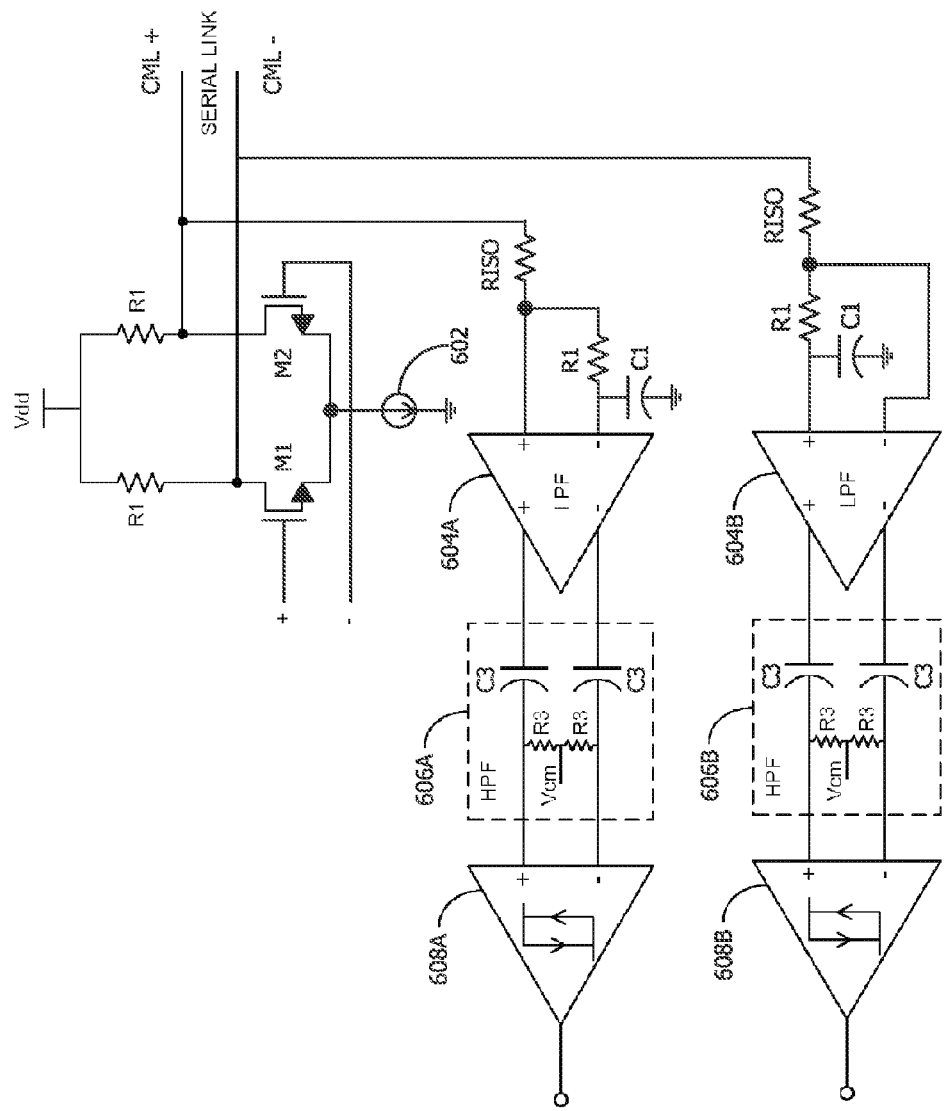
FIG. 6B is a block diagram illustrating a forward channel high speed data transmitter and multiple reverse channel low speed data receivers in accordance with another example implementation of the disclosure.
Figure 7:
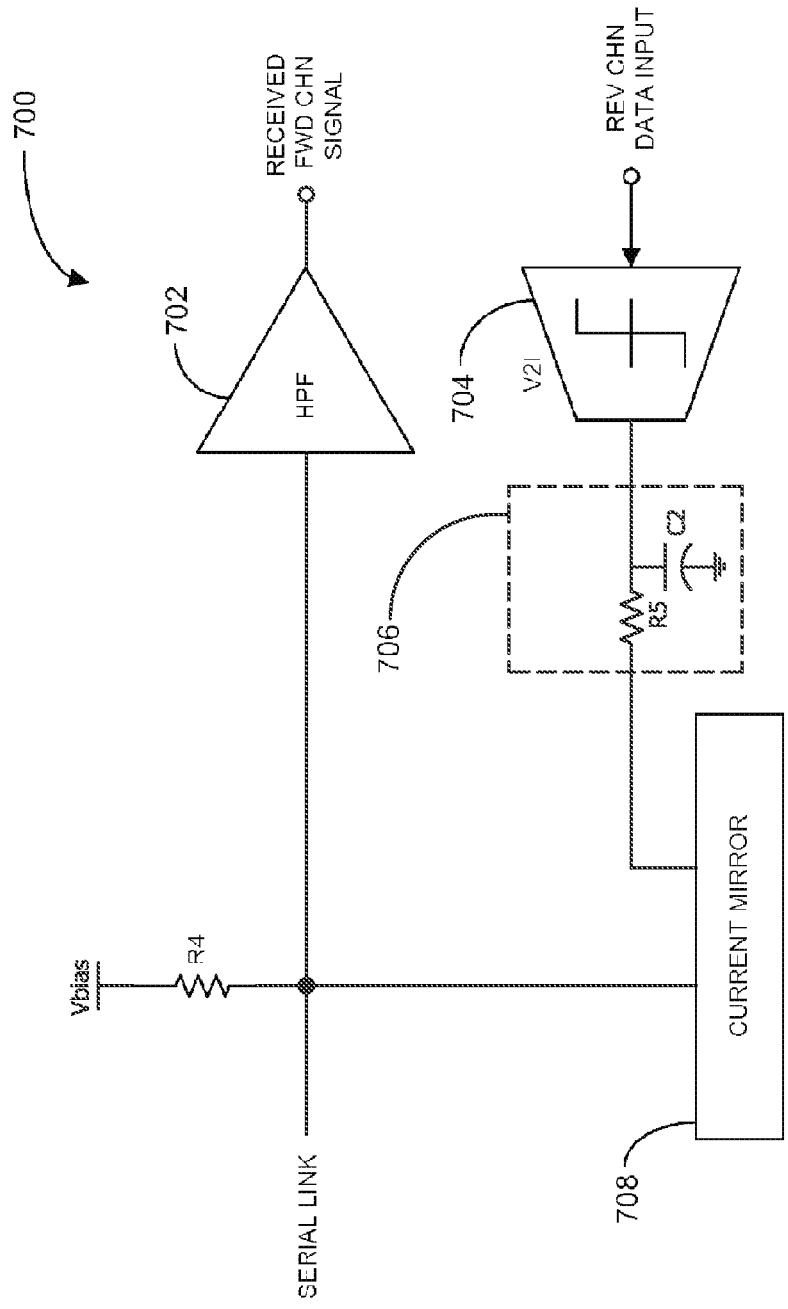
FIG. 7 is a block diagram illustrating a forward channel high speed data receiver and a reverse channel low speed data transmitter in accordance with an example implementation of the disclosure.

With respect to FIGS. 6A through 7, it is understood that the component names of the associated resistors and capacitors are used to merely identify the components (e.g., resistors, capacitors) and not to assign values to the identified components. For instance, various resistance and capacitance values may be utilized depending upon requirements of the systems 600 and 700 (e.g., the frequencies of the signals in the data links, etc.). FIG. 6A illustrates a block diagram of an example high-speed data transmitter and low-speed data receiver 600 in accordance with another implementation of the disclosure. The system 600 is one example implementation of the FC source 420 and 520 of systems 400 and 500, respectively. In particular, the system 600 comprises a forward channel transmitter including a pair of resistors R1, a differential pair of transistors M1 and M2 (e.g., metal oxide semiconductor field effect transistors (MOSFETs)), and a current source 602. The resistors R1 are coupled between a positive supply voltage rail and the drains of MOSFETs M1 and M2, respectively. The resistors R1 provide a termination load for the serial link. In an implementation, the resistors may be configured to have a resistance of fifty Ohms (50Ω). However, other resistors of differing values may be utilized depending upon the requirements of the system 600. The current source 602 is coupled between the sources of MOSFETs M1 and M2, and a negative supply voltage rail, which could be ground. The forward channel data is applied differentially to the gates of the FETs M1 and M2. As shown, a pair of conductors is coupled to the drains of FETs M1 and M2. A first conductor (CML+) is connected to the single-ended serial link. Depending upon the topology of the system 600, the second conductor (CML−) may be left floating or terminated to the supply or ground with a proper termination resistance (e.g., fifty Ohms (50Ω)).

The system 600 further comprises a reverse channel receiver including resistor $R_{ISO}$, resistor R1, R3, capacitors C1, C3, LPF 604, HPF 606, and a hysteresis comparator 608. As shown, the first conductor (CML+) of the forward channel transmitter is also coupled to the positive and negative inputs of the LPF 604 through a relatively large series resistor $R_{ISO}$ to reduce loading. It is understood that relatively large series resistor may comprise a resistor with a sufficiently large resistance value to reduce loading to the node. The R1-C1 filter is connected to negative terminal of the LPF 604 and at least substantially extracts the common mode voltage of the forward channel transmitter. Thus, the single-ended signal is transformed to a differential signal at the output of the LPF 604. However, it will be understood to those skilled in the art that other types of single-ended to differential signal conversion may be utilized. The LPF 604 also at least substantially removes the forward channel signal in order to recover (or produce) the reverse channel signal. The HPF 606, in turn, includes a pair of capacitors C3 coupled between the positive and negative outputs of the LPF 604 and the positive and negative inputs of the hysteresis comparator 608, respectively. Additionally, the HPF 606 comprises a pair of resistors R3 coupled in series between the positive and negative inputs to the hysteresis comparator 608, and adapted to receive a common mode voltage Vcm at a node between the resistors R3. The HPF 606 is adapted to at least substantially remove the DC component of the received signal. The LPF 604 coupled in series with the HPF 606 collaborate to operate as a band pass filter (BPF). The hysteresis comparator 608 produces the reverse channel data from the received signal by, for example, producing a logic high signal in response to a rising edge of the received signal and a logic low signal in response to a falling edge. In another implementation, the system 600 may include digital processing circuitry that is configured to generate the reverse channel data through one or more digital filtering techniques (e.g., analog-to-digital converter, etc.).

FIG. 6B illustrates a block diagram of an example high-speed data transmitter and low-speed data receiver 600 in accordance with another implementation of the disclosure. As shown, the system 600 includes a splitter mode configuration that employs two reverse channel receivers to recover signals (forward channel signals and reverse channel signals) arriving from two different single-ended channels (e.g., from CML+ and from CML−). The system 600 comprises a reverse channel receiver including resistors $R_{ISO}$, resistors R1, R3, capacitors C1, C3, LPFs 604A, 604B, HPFs 606A, 606B, and hysteresis comparators 608A, 608B. As described above with respect to FIG. 6, the first conductor (CML+) of the forward channel transmitter is coupled to the positive and negative inputs of the first LPF 604A through a first relatively large series resistor $R_{ISO}$ to reduce loading. In this implementation, the second conductor (CML−) is coupled to the second LPF 604B through a second relatively large series resistor $R_{ISO}$ to reduce loading. The R1-C1 filter of LPF 604B is connected to the positive terminal of the LPF 604B and at least substantially extracts the common mode voltage of the forward channel transmitter. It is understood that the R1-C1 filter of LPF 604B may have different resistance and/or capacitance values than the R1-C1 filter of LPF 604A. For instance, the R1-C1 filter of LPF 604A may comprise a first resistance and/or capacitance values, and the R1-C1 filter of LPF 604B may comprise a second resistance and/or capacitance values. The LPF 604B also at least substantially removes the forward channel signal in order to recover (or produce) the reverse channel signal furnished by the second conductor (CML−). The HPF 606B, in turn, includes a pair of capacitors C3 coupled between the positive and negative outputs of the LPF 604B and the positive and negative inputs of the hysteresis comparator 608B, respectively. Additionally, the HPF 606B comprises a pair of resistors R3 coupled in series between the positive and negative inputs to the hysteresis comparator 608B, and adapted to receive a common mode voltage Vcm at a node between the resistors R3. The HPF 606B is adapted to at least substantially remove the DC component of the received signal. The LPF 604B coupled in series with the HPF 606B collaborate to operate as a band pass filter (BPF). The hysteresis comparator 608B produces the reverse channel data from the received signal by, for example, producing a logic high signal in response to a rising edge of the received signal and a logic low signal in response to a falling edge.

FIG. 7 illustrates a block diagram of an example high-speed data receiver and low-speed data transmitter 700 in accordance with another implementation of the disclosure. The system 700 is one example implementation of the FC sinks 460 of system 400, as well as 540 and 560 of system 500. In particular, the system 700 comprises a forward channel receiver including an HPF 702, and a reverse channel transmitter including voltage-to-current (V2I) converter 704, an LPF 706, a current mirror 708, and a resistor R4. The HPF 702 includes an input coupled to the conductor of the serial link. The HPF 702 is configured to at least substantially remove the reverse channel signal in order to produce the received forward channel signal.

The V2I converter 704 receives the reverse channel data, and generates a current signal based on the reverse channel data. The LPF 706 comprises a resistor R5 coupled to the output of the V2I converter 704 and the input of the current mirror 708. Additionally, the LPF 706 comprises a capacitor C2 coupled to output of the V2I converter 704 and the negative supply voltage, which could also be at ground potential. The LPF 706 controls the slew rate of the reverse channel signal so that its spectral content does not significantly interfere with the spectral content of the forward channel data. The output of the current mirror 708 is coupled to the conductor of the serial link. The resistor R4 is coupled between the positive supply voltage rail or an internally generated bias voltage (shown as Vbias in FIG. 7) and the serial link conductor. The resistor R4 provides a termination load for the serial link, and may be configured to have a resistance of fifty Ohms (50Ω). In this configuration, the current mirror 708 modulates the forward channel signal in response to the reverse channel data.

Figure 8:
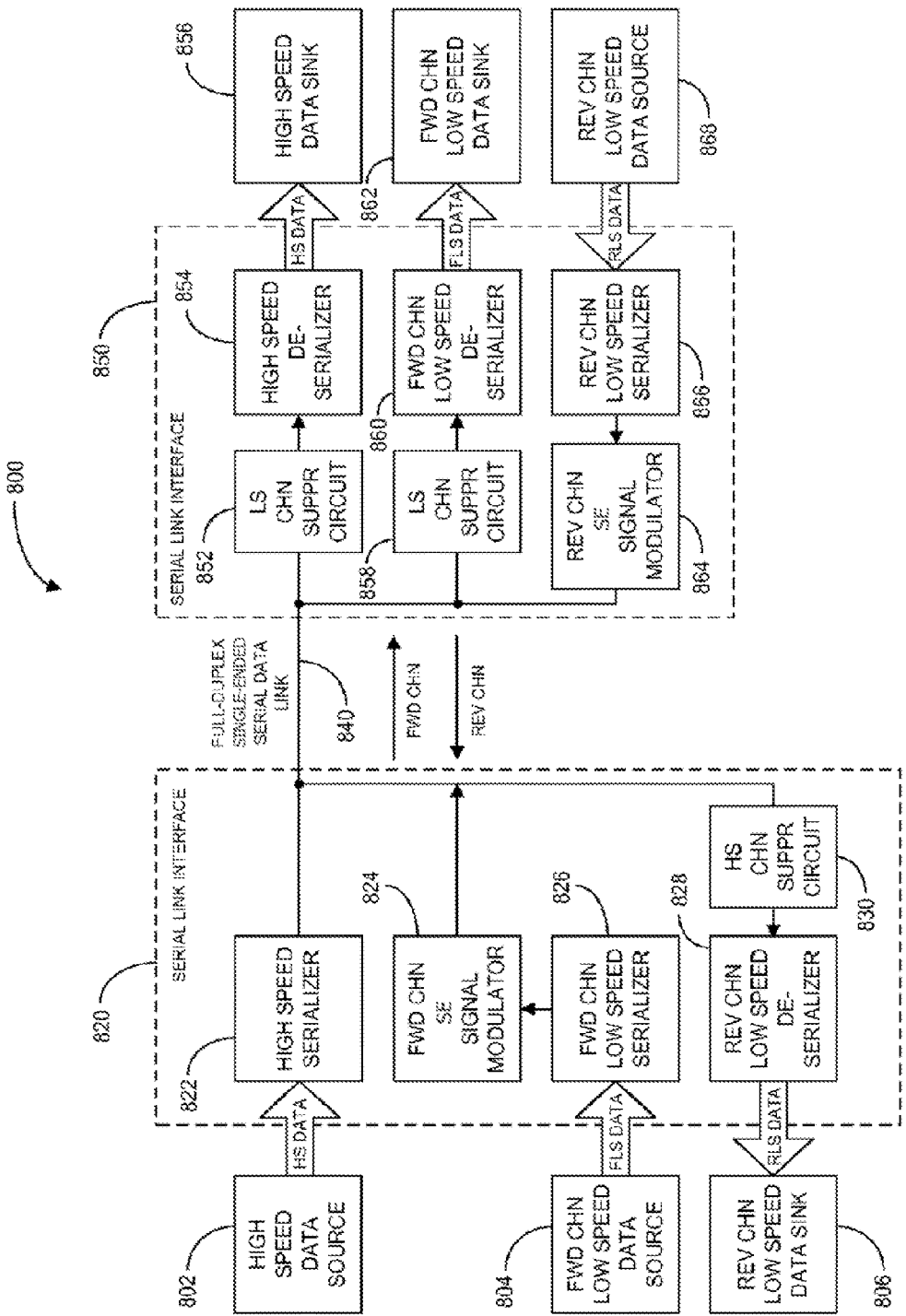
FIG. 8 is a block diagram illustrating another system for transferring data in accordance with another example implementation of the disclosure, wherein the system includes a high speed data source, a forward channel low speed data source, a reverse channel low speed data sink, a high speed data sink, a forward channel low speed data sink, and a reverse channel low speed data source.

FIG. 8 illustrates a block diagram of another example system 800 for transferring data in accordance with another aspect of the disclosure. In the previously-described system 100, the forward channel low speed data was time-multiplexed with the high speed data for transmission in the forward direction via the full-duplex single-ended serial data link. The reverse channel low speed data was modulated onto the forward channel signal for transmission in the reverse direction via the full-duplex single-ended serial data link. In system 800, the forward channel low speed data is modulated onto the high speed forward channel signal, in the same manner as the reverse channel low speed is modulated onto the high speed forward channel signal.

In particular, the system 800 comprises a high speed data source 802, a forward channel (FWD CHN) low speed data source 804, and a reverse channel (REV CHN) low speed data sink 806, all of which are situated at one end of a full-duplex single-ended serial data link 840. The high speed data source 802 may generate parallel high speed (HS) data (e.g., video data). In another implementation, the high speed data source 802 may be a high-speed clock source to establish the half-duplex control channel over a clock distribution system (e.g., tree). The FWD CHN low speed data source 804 may generate parallel, forward (channel) low speed (FLS) data (e.g., control and/or audio data). The REV CHN low speed data sink 806 may receive parallel, reverse (channel) low speed data (e.g., control data).

The system 800 further comprises a serial link interface 820 for interfacing the high speed data source 802, FWD CHN low speed data source 804, and REV CHN low speed data sink 806 to the full-duplex single-ended serial data link 840. The serial link interface 820 comprises a high speed serializer 822, a FWD CHN SE signal modulator 824, a FWD CHN low speed serializer 826, a REV CHN low speed deserializer 828, and a HS CHN suppression circuit 830. The high speed serializer 822 converts the parallel HS data from the high speed data source 822 into serialized data, and generates a single-ended signal of the forward channel data for transmission via the full-duplex single-ended serial data link 840.

The FWD CHN low speed serializer 826, in turn, converts the parallel FLS data from the FWD CHN low speed data source 804 into serial data. The FWD CHN SE signal modulator 824 modulates the forward channel signal with the serialized FLS data. The FWD CHN SE signal modulator 824 may include a slew rate control to modulate the forward channel signal in a relatively slow manner to control the spectral content of the reverse channel to at least substantially isolate it from the spectral content of the forward channel. In some cases, the FWD CHN low speed data source 804 may generate the FLS data in a serial manner. In such a case, the FWD CHN low speed serializer 826 may be eliminated, and the FWD CHN low speed data source 804 may be directly coupled to the FWD CHN SE signal modulator 824.

The HS CHN suppression circuit 830 suppresses the high speed forward channel signal in order to at least substantially output the serial, reverse (channel) low speed (RLS) data received from the opposite end of the full-duplex single-ended serial data link 840. Similar to the previous implementations, the HS CHN suppression circuit may be an LPF or BPF adapted to filter out the high-frequency forward channel signal. Also similarly, the HS CHN suppression circuit 830 may be a signal cancellation device for at least substantially cancelling out the forward channel signal. The REV CHN low speed deserializer 828 converts the serial RLS data into parallel RLS data for processing by the REV CHN low speed data sink 806.

At the other end of the full-duplex single-ended serial link 840, the system 800 comprises a high speed data sink 856, a FWD CHN low speed data sink 862, and a REV CHN low speed data source 868. The high speed data sink 856 receives and processes the parallel high speed (HS) data (e.g., video data) from the high speed data source 802. The FWD CHN low speed data sink 862 receives and processes the parallel FLS data (e.g., control and/or audio data) from the FWD CHN low speed data source 804. The REV CHN low speed data source 868 generates the parallel RLS data (e.g., control data) for transmission to the REV CHN low speed data sink 806.

The system 800 further comprises a serial link interface 850 for interfacing the high speed data sink 856, FWD CHN low speed data sink 862, and REV CHN low speed data source 868 to the full-duplex single-ended serial data link 840. The serial link interface 850 comprises a LS CHN suppression circuit 852, a high speed deserializer 854, a HS CHN suppression circuit 858, a FWD CHN low speed deserializer 860, a REV CHN low speed serializer 866, and a single-ended (SE) signal modulator 864.

The LS CHN suppression circuit 852 suppresses the forward and reverse channel low speed data signal (e.g., the serialized FLS and RLS data) in order to at least substantially output the serial, forward channel data (e.g., the HS data) received from the opposite end of the full-duplex single-ended serial data link 840. As an example, the LS CHN suppression circuit 852 may be a HPF or BPF adapted to filter out the low-frequency forward and reverse channel data. The high speed deserializer 854 converts the serial forward channel data into parallel forward channel data. The forward channel data is sent to the high speed data sink 856 for processing.

The HS CHN suppression circuit 858 suppresses the high speed forward channel signal (e.g., the serialized HS data) in order to at least substantially output the low speed forward channel data (e.g., the FLS data) received from the opposite end of the full-duplex single-ended serial data link 840. As an example, the HS CHN suppression circuit 858 may be an LPF or BPF adapted to filter out the high-frequency forward channel data. The FWD CHN deserializer 860 converts the serial FLS data into parallel FLS data. The FLS data is sent to the FWD CHN low speed data sink 862 for processing.

The REV CHN low speed serializer 866 converts the parallel RLS data from the REV CHN low speed data source 868 into serial RLS data. The SE signal modulator 864 modulates the forward channel signal with the RLS data. The SE signal modulator 864 may include a slew rate control to modulate the forward channel signal in a relatively slow manner to control the spectral content of the reverse channel to at least substantially isolate it from the spectral content of the forward channel. The forward and reverse low speed data are modulated onto the high speed forward channel data at distinct times. Thus, the communications of the low speed forward and reverse channel are in half-duplex mode. However, the high speed forward channel data may be transmitted simultaneously with the low speed forward or reverse channel data. It shall be understood that other forward channel low speed data may be time-multiplexed with the forward channel high speed data; thus, providing two methods for transmitting forward channel low speed data.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system for full duplex communications using a single-ended communications link comprising:

a first link interface configured to generate a signal for transmission via the single-ended communications link, the signal comprising data encoded in a forward channel; and a second link interface configured to receive the signal from the first link interface via the single-ended communications link and modulate the signal to encode data in a reverse channel so that the signal comprises the forward channel data and the reverse channel data simultaneously, wherein a voltage level of the signal comprising data encoded in the first channel is modulated according to a voltage level of the reverse channel data.

2. The system as recited in claim 1, wherein the forward channel data comprises relatively high speed serial data and relatively low speed serial data.

3. The system as recited in claim 2, wherein the relatively high speed serial data comprises video data and the relatively low speed serial data comprises control data.

4. The system as recited in claim 2, wherein the reverse channel data comprises relatively low speed serial data.

5. The system as recited in claim 2, wherein the first link interface further comprises a first serializer configured to generate the relatively high speed serial data from relatively high speed parallel data.

6. The system as recited in claim 5, wherein the first link interface further comprises a second serializer configured to generate the relatively low speed serial data from relatively low speed parallel data.

7. The system as recited in claim 1, the first link interface further comprises a forward channel suppression circuitry configured to at least substantially suppress the forward channel data portion of the signal to at least substantially output the reverse channel data portion of the signal received from the communications link.

8. The system as recited in claim 7, wherein the forward channel data is transmitted in a first frequency range and the reverse channel data is transmitted in a second frequency range, the first frequency range higher than the second frequency range, and wherein the forward channel suppression circuitry comprises a low pass filter to filter signals transmitted in the first frequency range.

9. The system as recited in claim 1, further comprising a single-ended communications link for coupling the first link interface and the second link interface.

10. An apparatus comprising:
a transmitter configured to generate a signal for transmission via a single-ended communications link, the signal comprising forward channel data and reverse channel data simultaneously, the forward channel data encoded in a forward channel by the transmitter, and the reverse channel data encoded in a reverse channel by a receiver configured to modulate the signal from the transmitter, a voltage level of the signal comprising data encoded in the first channel being modulated according to a voltage level of the reverse channel data; and forward channel suppression circuitry configured to at least substantially suppress the forward channel data portion of the signal to at least substantially output the reverse channel data portion of the signal received from the communications link.

11. The apparatus as recited in claim 10, wherein the forward channel data comprises relatively high speed serial data, and the reverse channel data comprises relatively low speed serial data.

12. The apparatus as recited in claim 11, wherein the relatively high speed serial data comprises video data and the relatively low speed serial data comprises control data.

13. The apparatus as recited in claim 10, wherein the reverse channel data comprises relatively low speed serial data.

14. The apparatus as recited in claim 10, wherein the transmitter further comprises a first serializer configured to generate the relatively high speed serial data from relatively high speed parallel data.

15. The apparatus as recited in claim 14, wherein the transmitter further comprises a second serializer configured to generate the relatively low speed serial data from relatively low speed parallel data.

16. The apparatus as recited in claim 10, wherein the forward channel data is transmitted in a first frequency range and the reverse channel data is transmitted in a second frequency range, the first frequency range higher than the second frequency range, and wherein the forward channel suppression circuitry comprises a low pass filter to filter signals transmitted in the first frequency range.

17. An apparatus comprising:
a receiver configured to receive a signal transmitted via a single-ended communications link, the signal comprising forward channel data and reverse channel data simultaneously, the forward channel data encoded in a forward channel by a transmitter, and the reverse channel data encoded in a reverse channel by the receiver, the receiver configured to modulate the signal from the transmitter, a voltage level of the signal comprising data encoded in the first channel modulated according to a voltage level of the reverse channel data; and reverse channel suppression circuitry configured to at least substantially suppress the reverse channel data portion of the signal to at least substantially output the forward channel data portion of the signal received from the communications link.

18. The apparatus as recited in claim 17, wherein the forward channel data comprises relatively high speed serial data, and the reverse channel data comprises relatively low speed serial data.

19. The apparatus as recited in claim 18, wherein the relatively high speed serial data comprises video data and the relatively low speed serial data comprises control data.

20. The apparatus as recited in claim 17, wherein the forward channel data is transmitted in a first frequency range and the reverse channel data is transmitted in a second frequency range, the first frequency range higher than the second frequency range, and wherein the reverse channel suppression circuitry comprises a high pass filter to filter signals transmitted in the second frequency range.

* * * * *